(12) United States Patent
Wang et al.

(10) Patent No.: US 10,009,909 B2
(45) Date of Patent: Jun. 26, 2018

(54) CHANGING SEMI-PERSISTENT SCHEDULING INTERVAL

(71) Applicant: TELEFONAKTIEBOLAGET L M ERICSSON (PUBL), Stockholm (SE)

(72) Inventors: Jun Wang, Nanjing (CN); Peng Chen, Nanjing (CN); Shan Li, Nanjing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 103 days.

(21) Appl. No.: 15/030,104

(22) PCT Filed: Oct. 24, 2013

(86) PCT No.: PCT/CN2013/085839
§ 371 (c)(1),
(2) Date: Apr. 18, 2016

(87) PCT Pub. No.: WO2015/058382
PCT Pub. Date: Apr. 30, 2015

(65) Prior Publication Data
US 2016/0270093 A1 Sep. 15, 2016

(51) Int. Cl.
*H04W 72/08* (2009.01)
*H04W 72/04* (2009.01)
(Continued)

(52) U.S. Cl.
CPC .......... *H04W 72/085* (2013.01); *H04J 11/00* (2013.01); *H04L 5/00* (2013.01); *H04L 5/0055* (2013.01); *H04L 61/6022* (2013.01); *H04W 72/04* (2013.01); *H04W 72/042* (2013.01); *H04W 72/0413* (2013.01); *H04W 84/042* (2013.01)

(58) Field of Classification Search
CPC . H04W 72/04; H04W 52/0216; H04W 72/12; H04W 88/02; H04L 1/1819
See application file for complete search history.

(56) References Cited

U.S. PATENT DOCUMENTS 9,178,667 B2 * 11/2015 Hsu .................. H04L 1/1893
9,363,797 B2 * 6/2016 Freda .............. H04W 72/0406
(Continued)

FOREIGN PATENT DOCUMENTS

CN 101547135 A 9/2009
CN 101677460 A 3/2010
(Continued)

OTHER PUBLICATIONS

Panasonic, Details on SPS reconfiguration, 3GPP TSG-RAN WG2 Meeting #76, R2-115891, Nov. 14-18, 2011.
(Continued)

*Primary Examiner* — Chandrahas B Patel (57) ABSTRACT

It is presented a method for changing a semi-persistent scheduling, SPS, interval for a wireless device from an original SPS interval to a new SPS interval. The method is performed in a network node and comprises the steps of: determining that the SPS interval is to be changed; generating a message element comprising an indicator of the new SPS interval; and transmitting a signal comprising the message element to the wireless device over a user plane. A corresponding network node, computer program and computer program product are also presented.

21 Claims, 3 Drawing Sheets

(51) Int. Cl.
  *H04J 11/00* (2006.01)
  *H04L 5/00* (2006.01)
  *H04L 29/12* (2006.01)
  *H04W 84/04* (2009.01)

(56) References Cited

U.S. PATENT DOCUMENTS

2009/0103500 A1* 4/2009 Malkamaki ........... H04L 1/1812
  370/336
2013/0163536 A1 6/2013 Anderson et al.
2013/0163543 A1 6/2013 Freda et al.

FOREIGN PATENT DOCUMENTS

WO 2010102447 A1 9/2010
WO 2013051976 A1 4/2013

OTHER PUBLICATIONS

3GPP TS 36.331 V13.0.0, 3rd Generation Partnership Project; Technical Specification Group Radio Access Network; Evolved Universal Terrestrial Radio Access (E-UTRA); Radio Resource Control (RRC); Protocol specification (Release 13), section 6.3.2 SPS-Config, Dec. 2015.

3GPP TS 36.321 V13.0.0, 3rd Generation Partnership Project; Technical Specification Group Radio Access Network; Evolved Universal Terrestrial Radio Access (E-UTRA); Medium Access Control (MAC) protocol specification (Release 13), section 5.10 Semi-Persistent Scheduling, Dec. 2015.

3GPP TS 36.213 V13.0.1, 3rd Generation Partnership Project; Technical Specification Group Radio Access Network; Evolved Universal Terrestrial Radio Access (E-UTRA); Physical layer procedures (Release 13), section 9.2 PDCCH/EPDCCH validation for semi-persistent scheduling.

* cited by examiner

CHANGING SEMI-PERSISTENT SCHEDULING INTERVAL

This application is a 371 of International Application No. PCT/CN2013/085839, filed Oct. 24, 2013, the disclosure of which is fully incorporated herein by reference.

TECHNICAL FIELD

The invention relates to a method, a network node, a computer program and a computer program product for changing a semi-persistent scheduling interval.

BACKGROUND

Cellular communication networks evolve towards higher data rates, together with improved capacity and coverage. In the 3rd Generation Partnership Project (3GPP) standardization body, several technologies have been and are also currently being developed.

LTE (Long Term Evolution) is a recent standardised technology. It uses an access technology based on OFDM (Orthogonal Frequency Division Multiplexing) for the downlink and Single Carrier FDMA (SC-FDMA) for the uplink. The resource allocation to wireless devices (also known as user equipment, UEs) on both downlink and uplink is generally performed adaptively using fast scheduling, taking into account the instantaneous traffic pattern and radio propagation characteristics of each wireless device. Assigning resources in both downlink and uplink is performed in the scheduler situated in the radio base station.

However, for periodic low volume traffic, such as for voice (e.g. using VoLTE, Voice over LTE) and other QoS (Quality of Service) applications, such dynamic scheduling consumes a significant amount of overhead in comparison to the payload traffic. In order to reduce this problem, semi-persistent scheduling (SPS) has been introduced to reduce the signaling overhead for periodic traffic.

On the one hand, SPS takes care of stable periodic transmissions efficiently. On the other hand, SPS does not efficiently handle variations in the periodicity very well, often causing a fall back to the dynamic scheduling with a relatively high overhead.

SUMMARY

It is an object to improve how SPS intervals are changed.

According to a first aspect, it is presented a method for changing a semi-persistent scheduling, SPS, interval for a wireless device from an original SPS interval to a new SPS interval. The method is performed in a network node and comprises the steps of: determining that the SPS interval is to be changed; generating a message element comprising an indicator of the new SPS interval; and transmitting a signal comprising the message element to the wireless device over a user plane.

The step of determining may comprise determining that the SPS interval for a downlink connection is to be changed.

The step of determining may comprise determining that the SPS interval for an uplink connection is to be changed.

The step of determining may comprise determining that SPS is to be deactivated and the step of generating may comprise providing an indicator of a new SPS interval indicating a deactivation of SPS.

In the step of generating, the message element may be a media access control element, MCE.

In the step of generating, the indicator of a new SPS interval may be four bits in size.

The method may further comprise the step of switching to the new SPS interval when an acknowledgement, indicating successful receipt of the signal, is received from the wireless device.

The method may further comprise the step of keeping the original SPS interval when an acknowledgement, indicating successful receipt of the signal, is not received from the wireless device.

The method may further comprise the step of: detecting a mismatch between the new SPS interval which is used for by network node and an SPS interval used by the wireless device; and restarting the method from the step of generating a message element when a mismatch is detected.

The step of detecting a mismatch may comprise detecting a mismatch when discontinuous transmission, DTX, is detected to or from the wireless terminal.

According to a second aspect, it is presented a network node for changing a semi-persistent scheduling, SPS, for a wireless device from an original SPS interval to a new SPS interval. The network node comprises: a processor; and a memory storing instructions that, when executed by the processor, causes the network node to:
  determine that the SPS interval is to be changed; generate a message element comprising an indicator of the new SPS interval; and transmit a signal comprising the message element to the wireless device over a user plane.

The instructions to determine may comprise instructions that, when executed by the processor, causes the network node to determine that the SPS interval for a downlink connection is to be changed.

The instructions to determine may comprise instructions that, when executed by the processor, causes the network node to determine that the SPS interval for an uplink connection is to be changed.

The instructions to determine may comprise instructions that, when executed by the processor, causes the network node to determine that SPS is to be deactivated and the instructions to generate may comprise instructions that, when executed by the processor, causes the network node to provide an indicator of a new SPS interval indicating a deactivation of SPS.

The message element may be a media access control element, MCE.

The indicator of a new SPS interval may be four bits in size.

The network node may further comprise instructions that, when executed by the processor, causes the network node to switch to the new SPS interval when an acknowledgement, indicating successful receipt of the signal, is received from the wireless device.

The network node may further comprise instructions that, when executed by the processor, causes the network node to keep the original SPS interval when an acknowledgement, indicating successful receipt of the signal, is not received from the wireless device.

The network node may further comprise instructions that, when executed by the processor, causes the network node to: detect a mismatch between the new SPS interval which is used for by network node and an SPS interval used by the wireless device; and to restart the execution from the instructions to generate a message element, when a mismatch is detected.

The instructions to detect a mismatch may comprise instructions that, when executed by the processor, causes the network node to detect a mismatch when discontinuous transmission, DTX, is detected to or from the wireless terminal.

According to a fourth aspect, it is presented a network node comprising: means for determining that an SPS, Semi-Persistent Scheduling interval for a wireless device is to be changed, from an original SPS interval to a new SPS interval; means for generating a message element comprising an indicator of the new SPS interval; and means for transmitting a signal comprising the message element to the wireless device over a user plane.

The means for determining may comprise means for determining that the SPS interval for a downlink connection is to be changed.

The means for determining may comprise means for determining that the SPS interval for an uplink connection is to be changed.

The means for determining may comprise means for determining that SPS is to be deactivated and the means for generating may comprise means for providing an indicator of a new SPS interval indicating a deactivation of SPS.

The message element may be a media access control element, MCE.

The indicator of a new SPS interval may be four bits in size.

The network node may further comprise means for switching to the new SPS interval when an acknowledgement, indicating successful receipt of the signal, is received from the wireless device.

The network node may further comprise means for keeping the original SPS interval when an acknowledgement, indicating successful receipt of the signal, is not received from the wireless device.

The network node may further comprise the means for: detecting a mismatch between the new SPS interval which is used for by network node and an SPS interval used by the wireless device; and means for restarting from generating a message element when a mismatch is detected.

The means for detecting a mismatch may comprise detecting a mismatch when discontinuous transmission, DTX, is detected to or from the wireless terminal.

According to a fourth aspect, it is presented a computer program for changing a semi-persistent scheduling, SPS, interval for a wireless device from an original SPS interval to a new SPS interval. The computer program comprises computer program code which, when run on a network node causes the network node to: determine that the SPS interval is to be changed; generate a message element comprising an indicator of the new SPS interval; and transmit a signal comprising the message element to the wireless device over a user plane.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
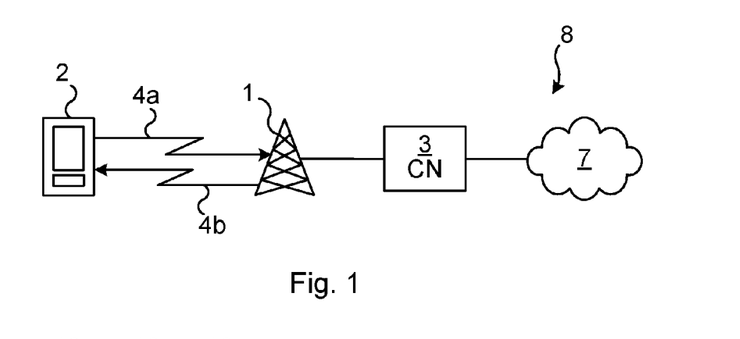
FIG. 1 is a schematic diagram illustrating a cellular network where embodiments presented herein may be applied.

FIG. 1 is a schematic diagram illustrating a cellular network 8 where embodiments presented herein may be applied. The cellular network 8 comprises a core network 3 and one or more network nodes 1, here in the form of radio base stations being evolved Node Bs, also known as eNode Bs or eNBs. The network node 1 could also be in the form of Node Bs, BTSs (Base Transceiver Stations) and/or BSSs (Base Station Subsystems), etc. The network node 1 provides radio connectivity to a plurality of wireless devices 2. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink (UL) 4a communication from the wireless device 1 and downlink (DL) 4b communication to the wireless device 2 between the wireless device 2 and the network node 1 occur over a wireless radio interface. The quality of the wireless radio interface to each wireless device 2 can vary over time and depending on the position of the wireless device 2, due to effects such as fading, multipath propagation, interference, etc.

The network node 1 is also connected to the core network 3 for connectivity to central functions and a wide area network 7, such as the Internet.

Figure 2:
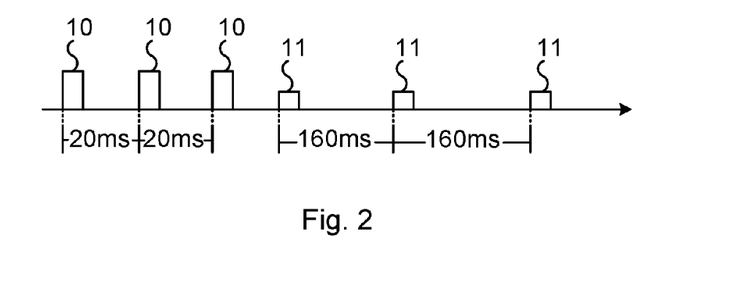
FIG. 2 is a schematic graph illustrating packets for voice transmissions.

FIG. 2 is a schematic graph illustrating packets for voice transmissions. For VoLTE, voice over LTE, traffic is delivered using IP (Internet Protocol). In a typical VoLTE arrangement, a voice encoder on the transmitter side encodes the speech into packets with a typical periodicity of 20 ms. This is shown in FIG. 2 as voice frames 10. The speech encoders also uses Voice Activity Detection in order to identify when there are talk spurts, denoted a talk state, and when there is only silence, denoted silence state. During the silence state, the voice encoder generates Silence Indication Descriptor (SID) frames 11 that the receiver uses to generate comfort noise. The SID frames 11 have a much longer spacing, 160 ms compared to toms in the talk state, and are also smaller ~400 bits compared to ~600 bits in the talk state.

Figure 3:
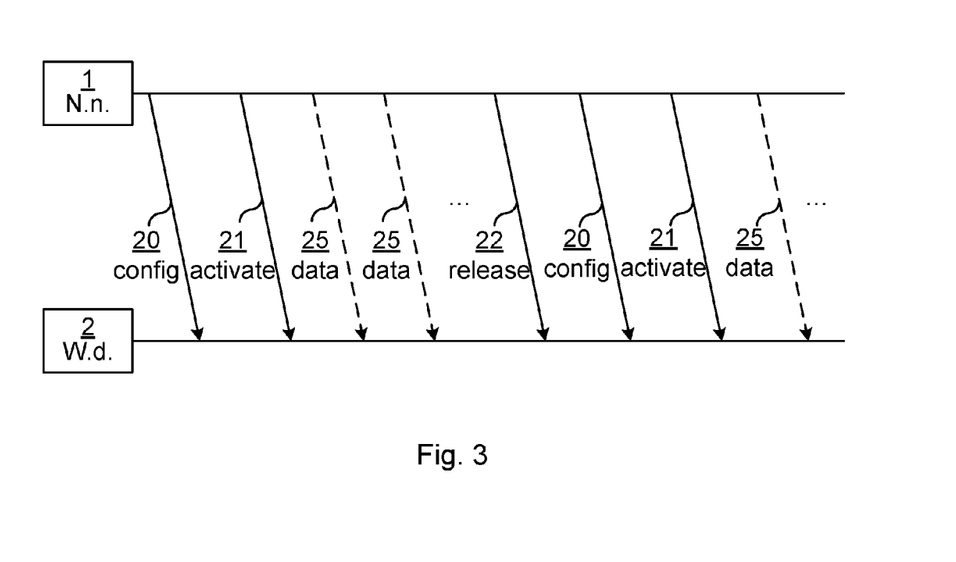
FIG. 3 is a schematic signalling diagram illustrating signalling for changing an SPS interval according to the prior art.

FIG. 3 is a schematic signalling diagram illustrating signalling for changing an SPS interval according to the prior art. The signalling occurs between the network node 1 and the wireless device 2.

Initially, SPS is set up from the network node 1, sending an SPS config message 20 over RRC (Radio Resource Control) to the wireless device 2. This message 20 comprises SPS parameters for DL/UL such as semiPersistSchedIntervalDL or semiPersistSchedIntervalUL which define the interval between SPS transmissions. After that, the network node 1 sends an SPS activate message 21 as a DCI (Downlink Control Information) message to the wireless device 2. This message 21 includes some SPS related parameters used for the SPS transmissions, such as MCS (Modulation and Coding Scheme), allocated PRBs (Physical Resource Blocks), HARQ (Hybrid Automatic Repeat Request) Process, etc. SPS is now active and data 25 is periodically transmitted in accordance with the SPS session from the network node 1 to the wireless terminal 2, i.e. without using dynamic scheduling.

If the SPS interval then needs to change, i.e. due to going from a talk state to a silent state from the transmission side for VoLTE, the network node 1 sends an SPS release message 22 as a DCI message, followed by a new SPS config message 20 over RRC specifying the new SPS interval. Only after SPS is again activated using a new SPS activate message 21, can data 25 be sent again using SPS, but now using the new SPS interval.

Only one SPS interval is supported for UL and DL respectively. Whenever there is a transition between the talk state and the silence state in the prior art and the SPS interval needs to change, the suspend-resume procedure and RRC-based reconfiguration mechanism shown in FIG. 3 is followed.

That procedure causes unexpected traffic interruption and unnecessary activation/deactivation overhead, which is particularly troublesome, e.g. for the frequent SPS interval changes required for transitions between the talk state and the silence state during VoLTE calls.

One way to handle the problems with the overhead problems for switching the SPS interval could be to instead use dynamic scheduling for one or both of the talk state and the silence state. However, then the benefits from SPS are not fully utilised.

Figure 4:
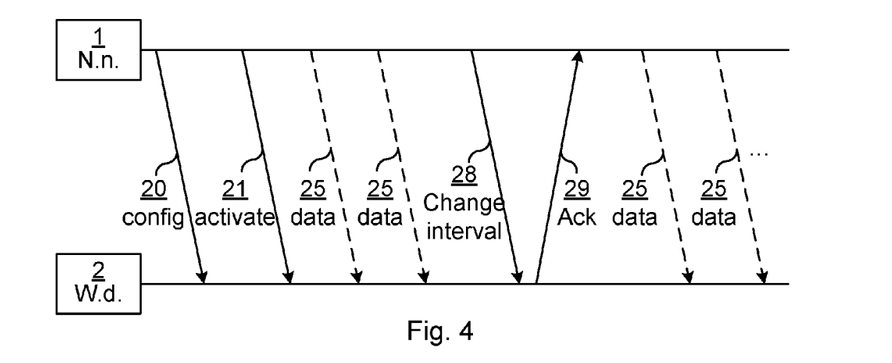
FIG. 4 is a schematic signalling diagram illustrating signalling for changing an SPS interval for downlink transmissions according one embodiment, initiated by the network node of FIG. 1.

FIG. 4 is a schematic signalling diagram illustrating signalling for changing an SPS interval for downlink according one embodiment, initiated by the network node 1 of FIG. 1.

Figure 5:
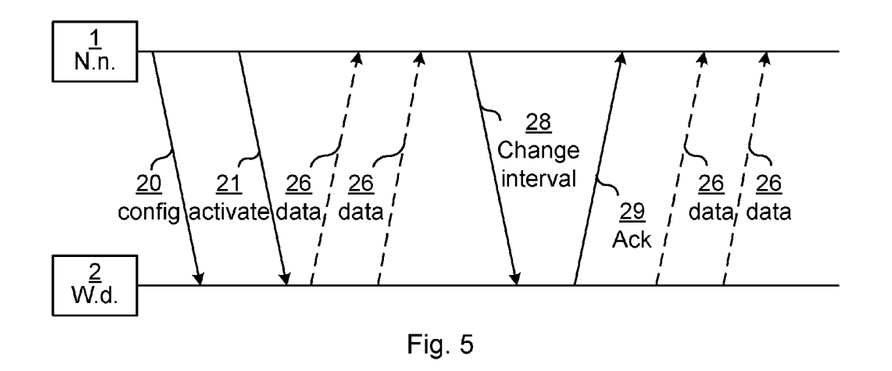
FIG. 5 is a schematic signalling diagram illustrating signalling for changing an SPS interval for uplink transmissions according one embodiment, initiated by the network node of FIG. 1.

In this embodiment, the initial SPS config message 20, the SPS activate message 21 and the first set of data 25 correspond to what is shown in FIG. 5.

However, when it is determined that the SPS interval needs to be changed, the network node 1 sends a change interval message 28 to the wireless device 2 over a user plane. For example, the change interval message 28 can be sent over the MAC (Media Access Control) layer. In this way, there is neither any need to send any SPS release message (22 of FIG. 3) which deactivates SPS nor any need to send the new RRC SPS reconfig message to specify the new interval as well as SPS reactivation message to resume SPS. The change interval message comprises an indicator of the new SPS interval.

The wireless device 2 receives the change interval message 28 and responds with an acknowledgement 29, in accordance with HARQ. In this way, the network node 1 knows that the wireless device 2 in question has correctly received the change interval message 28.

After the acknowledgement 29, the network node 1 sends data 25 in accordance with the new SPS interval.

FIG. 5 is a schematic signalling diagram illustrating signalling for changing an SPS interval for uplink according one embodiment, initiated by the network node 1 of FIG. 1. As for FIG. 4, the network node 1 sends an SPS config message 20 and an SPS activate message 21. Here however, since it is uplink data, the wireless device 2 sends uplink data 26 in accordance with how SPS is set up. When the network node 1 determines that the SPS interval needs to change, the network node 1 sends a change interval message 28 over the user plane and the wireless device 2 sends an acknowledgement 29, as in FIG. 4. The wireless device 2 is then ready to send further uplink data 26 in accordance with the new SPS interval.

Figure 6:
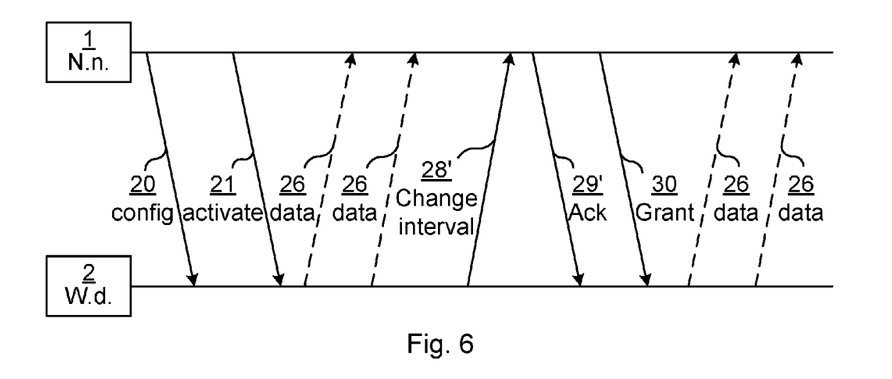
FIG. 6 is a schematic signalling diagram illustrating signalling for changing an SPS interval for uplink transmissions according one embodiment, initiated by the wireless device of FIG. 1.

FIG. 6 is a schematic signalling diagram illustrating signalling for changing an SPS interval according one embodiment. In this embodiment, the procedure to change SPS interval is initiated by the wireless device 2. As for FIG. 5, the network node 1 sends an SPS config message 20 and an SPS activate message 21, after which the wireless device 2 sends uplink data 26 in accordance with how SPS is set up. Here, however, it is the wireless device 2 that determines that the SPS interval should be changed and sends an uplink change interval request 28' as an MCE over MAC, comprising an indicator of the new SPS interval to the network node 1 over the user plane, after which the network node 1 responds with an acknowledgement 29' to the wireless device 2 if it decides to accept request from the wireless device. The change interval request 28' is only a suggestion from the wireless device perspective and the network node 1 can either fully accept, override or reject the change interval request 28'. If the network node 1 fully accepts the change interval request 28', the network node 1 sends a grant 30 to the wireless device 2, e.g. as part of a DCI format 0 (DCI0) message. After such a grant 30, the wireless device 2 sends future uplink data 26 using the new SPS interval. If the network node has different interval decision then what is included in the change interval request 28', the network node can override it by including a MCE (MAC Control Element) with overridden interval in PDSCH (Physical Downlink Shared Channel) to wireless device like it does in FIG. 5. If the network node rejects change interval request 28', the network node just ignores the request without any response.

Concerning uplink data, the switch between states, such as between the talk state and the silence state, is typically first detected by the wireless device 2, which can make it more appropriate for the wireless device 2 to trigger the SPS interval change.

Besides the normal Power Control indication in DCI0, the wireless device 2 can proactively decide to increase the transmission power of the specific UL transmission including the MCE with new interval request to increase the chance of the network node 1 being able to successfully decode the MCE.

Figure 7A:
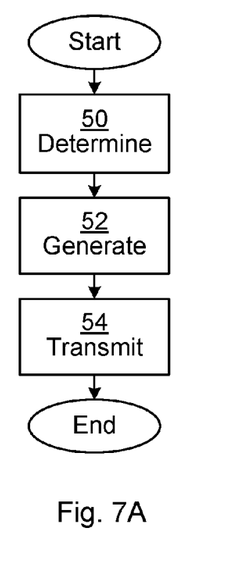
FIGS. 7A-B are flow charts illustrating methods performed in the network node of FIG. 1 for changing an SPS interval.
Figure 7B:
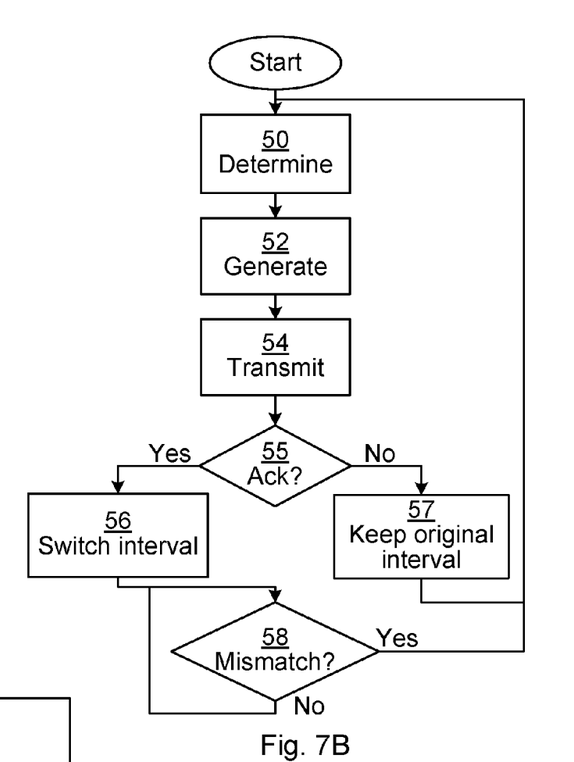

FIGS. 7A-B are flow charts illustrating methods performed in the network node of FIG. 1 for changing an SPS interval.

In a determine step 50, the network node 1 determines that the SPS interval is to be changed. This may comprise determining that the SPS interval for a downlink connection is to be changed, e.g. due to a switch between the talk state and the silence state in VoLTE. Alternatively or additionally, this comprises determining that the SPS interval for an uplink connection is to be changed.

In one embodiment, this step comprises determining that SPS is to be deactivated. In this way, the SPS interval is to be changed from an existing interval to a new interval, where the new interval can be considered to be to infinite. In other words, it is clear that a deactivation of SPS is also a change of SPS interval.

In a generate step 52, a message element is generated comprising an indicator of the new SPS interval. When it has previously been determined that SPS is to be deactivated, this step comprises providing an indicator of a special SPS interval indicating a deactivation of SPS.

In one embodiment, the message element is a media access control element, MCE, such as a new SPS interval MCE. Compared with DCI, MCE has the advantage that the SPS parameter can be freely changed per each SPS transmission period without extra PDCCH signalling overhead. The SPS interval MAC control element can e.g. be identified by a MAC PDU sub-header with LCID (Logical Channel ID) 0x11010. The SPS interval MCE can e.g. be a single octet where the first four bits are reserved bits, set to "0" and the remaining four bits are used to indicate the SPS interval. Other structures of the SPS interval MCE are equally possible.

For example, the downlink SPS interval can be indicated by the following enumeration:
 semiPersistSchedIntervalDL ENUMERATED {sf10, sf20, sf32, sf40, sf64, sf80, sf128, sf160, sf320, sf640, spare6, spare5, spare4, spare3, spare2, invalid_sf}

For example, the uplink SPS interval can be indicated by the following enumeration:
 semiPersistSchedIntervalDL ENUMERATED {sf10, sf20, sf32, sf40, sf64, sf80, sf128, sf160, sf320, sf640, spare6, spare5, spare4, spare3, spare2, invalid_sf}

In both enumerations, the digit parts indicate the SPS interval in ms and the invalid_sf (binary value 1111) indicates that SPS is to be deactivated.

In a transmit step 54, a signal comprising the message element is transmitted to the wireless device (2) over a user plane. This signal corresponds to the change interval message 28 of FIGS. 4 and 5. The signal can be sent as a MAC PDU (Protocol Data Unit) over PDCCH (Physical Downlink Control Channel).

FIG. 7B illustrates a method for changing an SPS interval according to one embodiment. This method is similar to the method illustrated in FIG. 7A, and only new or modified steps, in relation to FIG. 7A, will be described.

After the transmit step 54, there is here a conditional ack step 55. In the conditional ack step 55, it is checked whether an acknowledgement (se ack 29 in FIGS. 4 and 5), indicating successful receipt of the signal (sent in the transmit step 54) is received from the wireless device. Since the MCE is part of a MAC PDU, the existing HARQ retransmission mechanism can be reused to verify correct reception of the MCE containing the new SPS interval. If wireless device fails to successfully decode the MAC PDU, a NACK HARQ is fed back from the wireless device, indicating a failure of the reception of MAC PDU and the HARQ retransmission mechanism can be triggered to retransmit previous MAC PDU again. After a maximum number of HARQ retransmissions, if the wireless device still feeds back NACK, it indicates that the procedure to change the SPS interval has failed and the network node need restart interval change procedure at a later stage.

If an acknowledgement is received, the method continues to a switch interval step 56. Otherwise, the method continues to a keep original interval step 57.

In the switch interval step 56, the SPS interval for SPS transmissions is switched to the new SPS interval. After this step, the method continues to a conditional mismatch step 58.

In the keep original interval step 57, the original SPS interval is kept. In fact, this step does not need to involve any actions and can be considered to only be shown in FIG. 7B to explain the effects of the method. After this step, the method returns to the generate step 52 to reattempt changing the SPS interval.

In the conditional mismatch step 58, it is determined whether there is a mismatch between the new SPS interval which the network node uses and the SPS interval used by the wireless device. The mismatch can e.g. occur if the network node 1 erroneously interprets an ACK as a NACK or vice versa.

This mismatch can e.g. be detected using DTX (discontinuous transmission) For downlink, the network node would receive DTX HARQ acknowledgement from the wireless device and for the uplink, the network node would receive DTX PUSCH (Physical Uplink Shared Channel) transmission from the wireless device, indicating that the wireless device is not using the same SPS interval as the network node.

If there is a mismatch, the method returns to the generate step 52 to reattempt changing the SPS interval. Otherwise, the method continues to perform the conditional mismatch step 58, optionally via an idle period (not shown).

Figure 8:
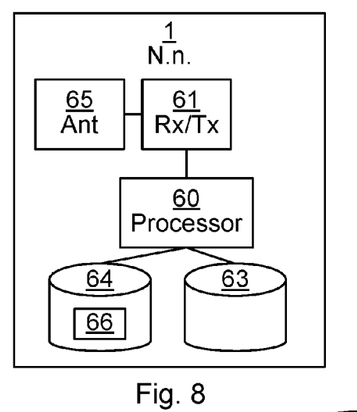
FIG. 8 is a schematic diagram showing some components of the network node of FIG. 1.

FIG. 8 is a schematic diagram showing some components of the network node 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIGS. 7A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM).

The network node 1 further comprises an I/O interface 62 for communicating with other external entities. Optionally, the I/O interface 62 also includes a user interface.

The network node 1 also comprises one or more transceivers 61, comprising analogue and digital components, and a suitable number of antennas 65 for wireless communication with wireless devices as shown in FIG. 1.

Other components of the network node 1 are omitted in order not to obscure the concepts presented herein.

Figure 9:
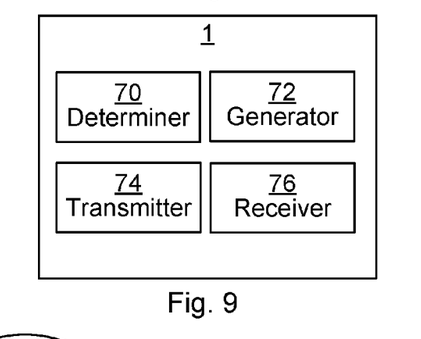
FIG. 9 is a schematic diagram showing functional modules of the network node of FIGS. 1 and 8.

FIG. 9 is a schematic diagram showing functional modules of the network node 1 of FIGS. 1 and 8. The modules can be implemented using software instructions such as a computer program executing in the network node 1 and/or using hardware, such as application specific integrated circuits, field programmable gate arrays, discrete logical components, etc. The modules correspond to the steps in the methods illustrated in FIGS. 7A-B.

A determiner 70 is arranged to determine that the SPS interval needs to be changed. This module corresponds to the determine step 50 of FIGS. 7A-B.

A generator 72 is arranged to generate a message element comprising an indicator of the new SPS interval. This module corresponds to the generate step of FIGS. 7A-B.

A transmitter 74 is arranged to transmit a signal comprising the message element to the wireless device over a user plane. This module corresponds to the transmit step of FIGS. 7A-B.

A receiver 76 is arranged to receive acknowledgements (ACKs) and/or non acknowledgements (NACKs) from a wireless device. This module corresponds to the conditional ack step 55 of FIG. 7B.

A switcher 78 is arranged to switch to the new SPS interval. This module corresponds to the switch interval step 56 of FIG. 7B.

A mismatch detector 79 is arranged to detect a mismatch in SPS interval between the network node and the wireless device. This module corresponds to the conditional mismatch step 58 of FIG. 7B.

Figure 10:
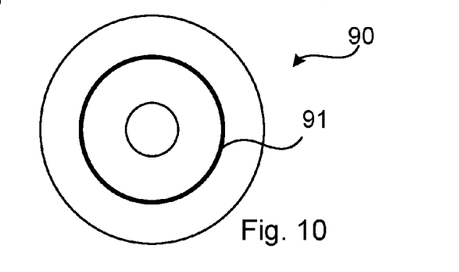
FIG. 10 shows one example of a computer program product comprising computer readable means.

FIG. 10 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 8. While the computer program 91 is here schematically shown as a track on the depicted optical disk, the computer program can be stored in any way which is suitable for the computer program product, such as a removable solid state memory.

The procedures described in embodiments herein have several beneficial effects compared to the prior art.

By moving the SPS interval change procedure to the user plane, e.g. from RRC to MAC, the SPS session no longer need suspend-resume mode to handle the SPS interval change, significantly reducing the risk of any service interruption. In fact, the change of SPS interval can be performed very often with minimal overhead, even as often as for each normal SPS transmission.

No longer relying on the RRC and SPS reactivation procedure, the existing signaling overhead is greatly decreased. The MAC signalling can be performed using a MAC PDU whose PRB resources have already been reserved. Hence, MAC solution decreases the RRC/MAC signaling overhead greatly and utilises the existing HARQ retransmission to verify successful SPS interval change.

The procedure shown can support more intervals and state transitions between any of these intervals during an existing SPS session in a piggyback fashion along with normal SPS transmission. This facilitates future more complex application scenarios where more SPS intervals may need to be supported and where the SPS intervals need to be changed often The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method implemented by a wireless device for changing a semi-persistent scheduling (SPS) interval from an original SPS interval to a new SPS interval, the method comprising the steps of:
   determining, by the wireless device, that the SPS interval is to be changed;
   generating, by the wireless device, a message element comprising an indicator of the new SPS interval; and
   transmitting, by the wireless device, a signal comprising the message element to a network node over a user plane.

2. The method according to claim 1, further comprising a step of receiving, by the wireless device, an acknowledgment from the network node after the network node decides to accept the new SPS interval.

3. The method according to claim 1, further comprising a step of receiving, by the wireless device from the network node, a media access control (MAC) element (MCE) including another SPS interval which the wireless device is to use rather than the new SPS interval.

4. The method according to claim 1, further comprising a step of determining, by the wireless device, that the network node rejected the new SPS interval by failing to receive a response from the network node after transmitting the signal comprising the message element to the network node over the user plane.

5. The method according to claim 1, wherein the message element is a media access control (MAC) element (MCE).

6. The method according to claim 1, further comprising a step of receiving, by the wireless device from the network node, a grant after the network node decides to fully accept the new SPS interval.

7. The method according to claim 6, further comprising a step of transmitting, by the wireless device to the network node, uplink data using the new SPS interval after the wireless device receives the grant from the network node.

8. The method according to claim 6, wherein the grant is part of a Downlink Control Information (DCI) format 0 (DCI0) message.

9. The method according to claim 1, wherein the step of determining that the SPS interval is to be changed is made by the wireless device after the wireless device detects a switch between a talk state and a silence state.

10. The method according to claim 1, further comprising a step of proactively deciding, by the wireless device, to increase transmission power when transmitting the signal comprising the message element to the network node over the user plane.

11. A wireless device for changing a semi-persistent scheduling (SPS) from an original SPS interval to a new SPS interval, the wireless device comprising:
a processor; and
a memory storing instructions that, when executed by the processor, causes the wireless device to:
determine that the SPS interval is to be changed;
generate a message element comprising an indicator of the new SPS interval; and
transmit a signal comprising the message element to a network node over a user plane.

12. The wireless device according to claim 11, further comprising instructions that, when executed by the wireless device, causes the wireless device to receive, from the network node, a grant after the network node decides to fully accept the new SPS interval.

13. The wireless device according to claim 12, further comprising instructions that, when executed by the wireless device, causes the wireless device to transmit, to the network node, uplink data using the new SPS interval after the wireless device receives the grant from the network node.

14. The wireless device according to claim 12, wherein the grant is part of a Downlink Control Information (DCI) format 0 (DCI0) message.

15. The wireless device according to claim 11, wherein the message element is a media access control (MAC) element (MCE).

16. The wireless device according to claim 11, further comprising instructions that, when executed by the wireless device, causes the wireless device to receive, from the network node, an acknowledgment after the network node decides to accept the new SPS interval.

17. The wireless device according to claim 11, further comprising instructions that, when executed by the wireless device, causes the wireless device to receive, from the network node, a media access control (MAC) element (MCE) including another SPS interval which the wireless device is to use rather than the new SPS interval.

18. The wireless device according to claim 11, further comprising instructions that, when executed by the wireless device, causes the wireless device to determine that the network node rejected the new SPS interval by failing to receive a response from the network node after transmitting the signal comprising the message element to the network node over the user plane.

19. The wireless device according to claim 11, further comprising instructions that, when executed by the wireless device, causes the wireless device to determine that the SPS interval is to be changed after the wireless device detects a switch between a talk state and a silence state.

20. The wireless device according to claim 11, further comprising instructions that, when executed by the wireless device, causes the wireless device to proactively decide to increase transmission power when transmitting the signal comprising the message element to the network node over the user plane.

21. A non-transitory computer readable medium containing computer program instructions for changing a semi-persistent scheduling (SPS) interval for a wireless device from an original SPS interval to a new SPS interval, wherein the computer program instructions, when run on the wireless device, causes the wireless device to:
determine that the SPS interval is to be changed;
generate a message element comprising an indicator of the new SPS interval; and
transmit a signal comprising the message element to a network node over a user plane.

* * * * *